United States Patent
Tan et al.

(10) Patent No.: US 10,222,878 B2
(45) Date of Patent: Mar. 5, 2019

(54) INFORMATION HANDLING SYSTEM VIRTUAL LASER POINTER

(71) Applicant: Dell Products L.P., Round Rock, TX (US)

(72) Inventors: Danilo O. Tan, Austin, TX (US); Fernando L. Guerrero, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 15/498,014

(22) Filed: Apr. 26, 2017

(65) Prior Publication Data

US 2018/0314345 A1 Nov. 1, 2018

(51) Int. Cl.
| | | |
|---|---|---|
| G06F 3/038 | (2013.01) | |
| G06F 3/0346 | (2013.01) | |
| G06F 3/0354 | (2013.01) | |

(52) U.S. Cl.
CPC .......... *G06F 3/0346* (2013.01); *G06F 3/0383* (2013.01); *G06F 3/0386* (2013.01); *G06F 3/03542* (2013.01)

(58) Field of Classification Search
CPC .... G06F 3/0346; G06F 3/0383; G06F 3/0386; G06F 3/03542
See application file for complete search history.

(56) References Cited

U.S. PATENT DOCUMENTS

| | | | | | |
|---|---|---|---|---|---|
| 7,477,236 | B2* | 1/2009 | Ofek | ...................... | G06F 3/0304 345/156 |
| 7,852,315 | B2* | 12/2010 | Ofek | ...................... | G06F 3/0346 345/157 |
| 2006/0248462 | A1* | 11/2006 | Ofek | ...................... | G06F 3/0304 715/730 |
| 2007/0013658 | A1* | 1/2007 | Chien | ................... | G06F 1/3203 345/158 |
| 2007/0236451 | A1* | 10/2007 | Ofek | ...................... | G06F 3/0304 345/157 |
| 2016/0179210 | A1* | 6/2016 | Sakai | ...................... | G06F 3/017 345/156 |

\* cited by examiner

*Primary Examiner* — Patrick F Marinelli
(74) *Attorney, Agent, or Firm* — Zagorin Cave LLP; Robert W. Holland

(57) ABSTRACT

A portable information handling system detects orientation relative to a calibration orientation and communicates the orientation to a projector for presentation of a virtual laser pointer image by the projector. Orientation changes at the portable information handling system, such as a smartphone, are communicated to the projector or an information handling system generating the projection visual images to that the pointer image changes positions on the projected display in response to a user hand motion.

17 Claims, 3 Drawing Sheets

INFORMATION HANDLING SYSTEM VIRTUAL LASER POINTER

BACKGROUND OF THE INVENTION

Field of the Invention

The present invention relates in general to the field of information handling system visual presentations, and more particularly to an information handling system virtual laser pointer.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems provide a convenient platform for making visual presentations, such as through a flat panel display or a graphics projector. One common application for presenting visual images is Power Point by Microsoft. In a typical usage scenario, a user opens a presentation with a portable information handling system and presents the presentation by using a graphics projector as a second display. The user controls the presentation from the portable information handling system, such as with control user interfaces that include notes and directories for the presentation, while the audience sees just presentation content from the projector. Other usage scenarios involve presentations shown on a shared display device, such as a television or large flat panel display, or presentations shown through a network interface, such as video conference.

Often during a presentation, an end user seeks to highlight content of interest to the audience. Presentation applications offer tools that help highlight content, such as animations or sequenced content that alters what the end user sees as the content is explained. As an example, a presentation may include a series of slides that modify key parts of the content as the presenter talks, with the presenter simply going to the next slide. In some instances, presenters desire a more ad hoc way to emphasize key points during a presentation, such as highlighting portions of content that are relevant to an audience question. Rather than manipulating content through the portable information handling system, a presenter often instead uses a pointing device to physically point to relevant images while the user stands next to projected content. Another alternative available to an end user is a laser pointer. Laser pointers include a laser that generates a point of light over a considerable distance. The presenter highlights content by pointing the laser at the relevant image.

Although laser pointers are convenient and easy to use, they are yet another item that a presenter must remember to bring and have charged up before the presentation. Laser pointers tend to come in a red color and have a finite size that may be difficult for some in the audience to follow, especially against like-colored content. Lasers typically have a low illumination intensity, however, a laser point light source can cause eye damage if directed directly at the face of an audience member. Since laser pointers generate a separate light source that is not part of the graphics presentation, laser pointer inputs do not offer permanent marks on the presentation that the audience can reference as the presentation continues. If the presenter wants to leave permanent marks as the presentation continues, the presenter typically must engage directly with the information handling system that is presenting the visual images.

SUMMARY OF THE INVENTION

Therefore, a need has arisen for a system and method which presents a virtual laser point image on presentation content.

In accordance with the present invention, a system and method are provided which substantially reduce the disadvantages and problems associated with previous methods and systems for highlighting presentation content presented by an information handling system. A visual point image location is wirelessly communicated from a portable information handling system to a presentation system based upon the orientation of the portable information handling system so that an end user manipulates the position of the visual point image on the presentation by movement of the portable information handling system.

More specifically, a presentation application executing on an information handling system processor generates content visual images for presentation at a display. For example a graphics processor unit receives the content visual images and processes pixel values for a display to present visual images of the content. A portable information handling system interfaces with the content, such as with a wireless interface to the presentation information handling system or display, to place a visual point image over the content at a position defined by orientation of the portable information handling system, thus effectively imitating a laser pointer. A pointer application executing on the portable information handling system manages communication of position information for the location of the visual point image on the display and details on the appearance of the visual point image, such as the color, generation of a trail that traces movement of the visual point image, turning the visual point image on and off, the proportional movement of the visual point image relative to motion of the portable information handling system and calibration of portable information handling system orientation to visual point image location at the display presentation The present invention provides a number of important technical advantages. One example of an important technical advantage is that a laser point light source highlights content of a presentation without directly illuminating the presentation. The laser point light source is instead generated at an information handling system that creates the presentation visual images and inserted over the presentation content with the light point position controlled through a wireless device, such as a smartphone. The laser pointer inputs may selectively leave permanent marks and trails for the audience to see with selection of different colors and marking profiles. The presenter controls the laser pointer location by movement of a portable handheld device, such as a smartphone or tablet. Position sensing by the portable device moves the laser point visual indicator based on end user motions with selectable sensitivity and originating positions so that the presenter is not tied to a hand position for a desired point illumination to show. This allows presenters greater freedom of movement when explaining visual images for more effective presentation hand movements.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A visual point image location provided by orientation of a portable information handling system imitates a laser pointer over a presentation made by a presentation information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
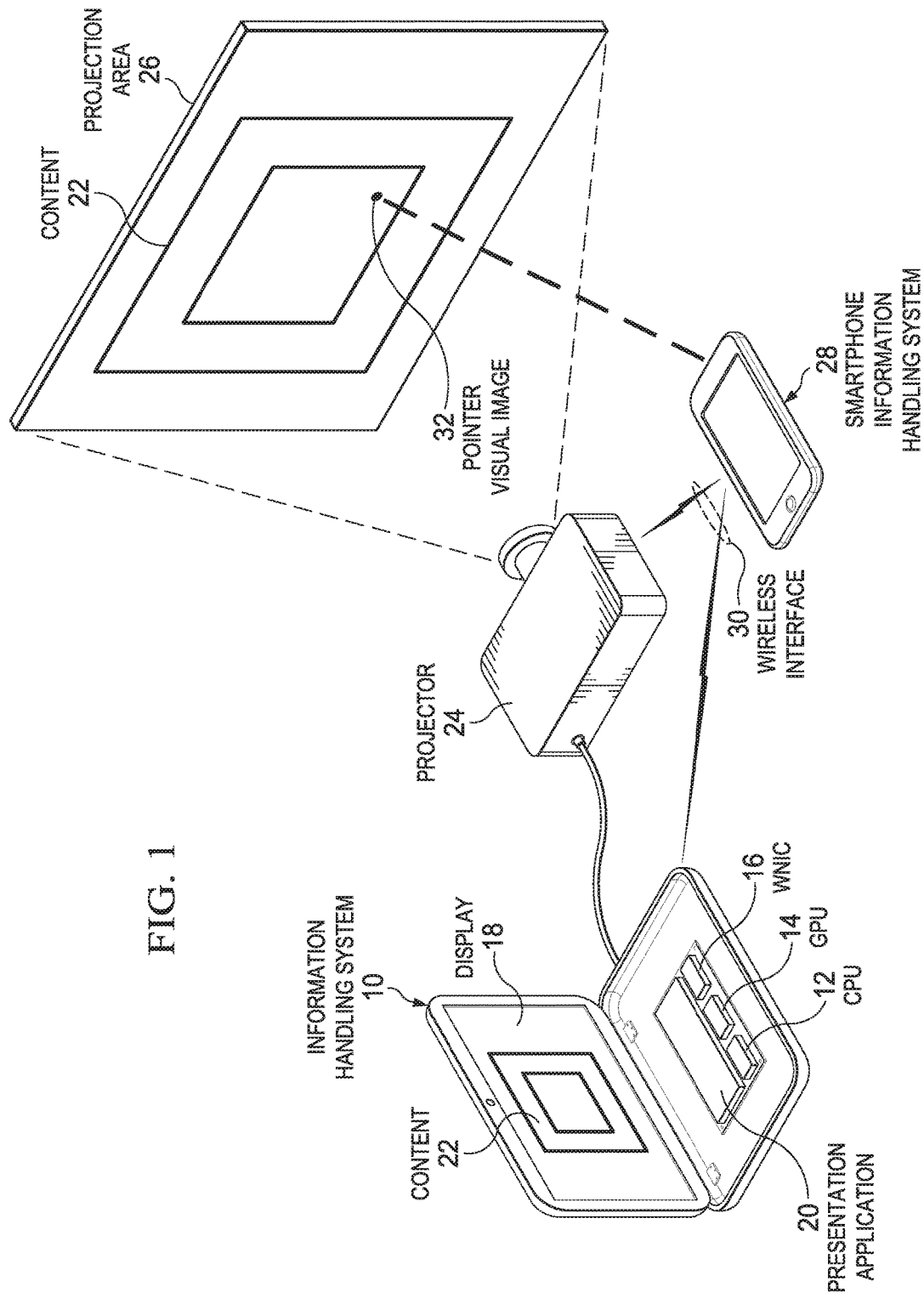
FIG. 1 depicts a block diagram of a system for placing a visual point image over a presentation in a manner that imitates a laser pointer.

Referring now to FIG. 1, a block diagram depicts a system for placing a visual point image 32 over a presentation 22 in a manner that imitates a laser pointer. An information handling system 10 executes a presentation application 20 on central processing unit (CPU) 12 to generate presentation content 22 for presentation to viewers, such as an audience. CPU 12 generates visual information that a graphics processing unit (GPU) 14 processes to generate pixel values used by a display to define visual images for content 22. In the example embodiment, presentation information handling system 10 has a laptop configuration that includes integrated wireless communication resources in a wireless network interface card (WNIC) 16 and an integrated display 18 for presenting visual images represented by GPU 14 pixel values. For example, an end user executes a presentation application 20, such as PowerPoint, to present content 22 at display 18 for local viewing and also wirelessly communicate content 22 to projector 24 through a wireless interface 30 for presentation by at a projection area 26. Content 22 at display 18 may include content that is not presented at projection area 26, such as presentation notes or presentation controls.

A mobile information handling system 28 separate from presentation information handling system 10, such as a smartphone or tablet, includes orientation detection circuits and logic, such as accelerometers, and wireless resources, such as WiFi or Bluetooth, so that a pointer application running on system 28 manages presentation of visual point image 32 presented over content 22. For example, a user holding smartphone information handling system 28 initiates presentation of pointer visual image 32 and then uses pointer visual image 32 to interact with content 22 by Changing the orientation of smartphone 28 to change the location of pointer visual image 32. In various embodiments, smartphone information handling system 28 manages the position of pointer visual image 32 in various ways. In one example embodiment, smartphone information handling system 28 detects orientation and translates the detected orientation to a location by comparison with a calibrated orientation, such as an orientation associated with display of pointer visual image 32 in a center position. Smartphone information handling system 28 then communicates the location for presentation of pointer visual image 32 to presentation information handling system 10 so that GPU 14 can generate pixel values of the pointer visual image at the correct location. Alternatively, smartphone information handling system 28 provides position information to projector 24 so that projector 24 generates pointer visual image 32 at the indicated location without processing by presentation information handling system 10. In an alternative embodiment, smartphone information handling system 28 provides orientation information to presentation information handling system 10 or projector 24, such as accelerometer and gyroscope data, so that presentation information handling system 10 can determine a location for pointer visual image 32. For example, smartphone information handling system 28 sends orientation information for a calibration orientation to presentation information handling system 10 can apply subsequent orientation information to determine a location change from a calibration location.

Figure 2B:
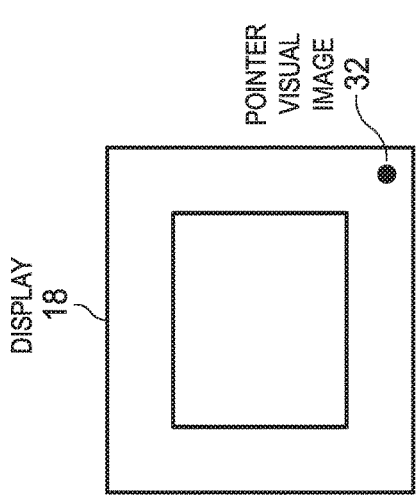
FIGS. 2A and 2B depict an example embodiment of calibration of a visual point image at an information handling system.
Figure 2B:
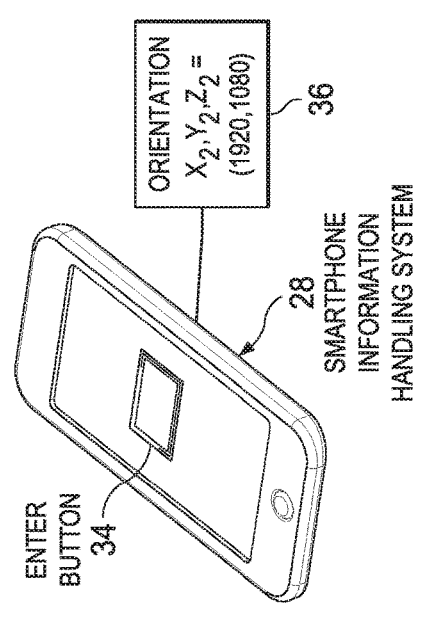
Figure 2A:
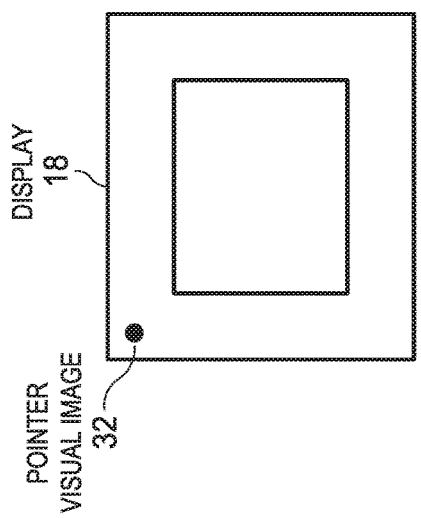
Figure 2A:
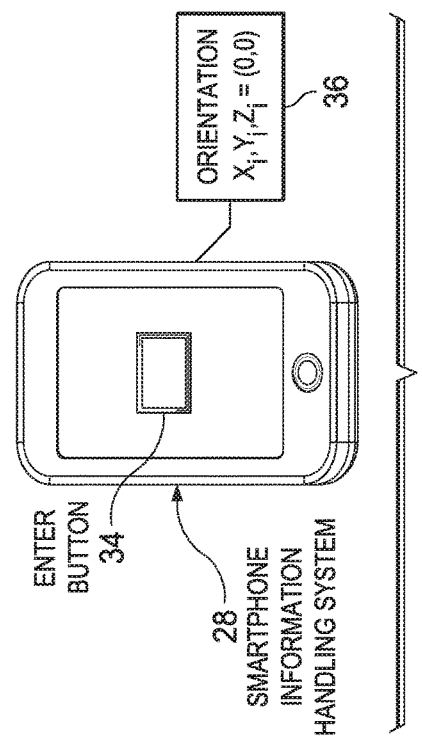

Referring now to FIGS. 2A and 2B, an example embodiment of calibration of a visual point image at an information handling system. When an end user initiates a calibration operation, such as by making an input at smartphone information handling system 28 enter button 34, pointer visual image 32 is presented in a corner position of display 18 and associated with orientation information 36 detected at smartphone 28, as depicted by FIG. 2A. Next, pointer visual image 32 shifts to an opposing diagonal position of display 18 so that the end user can make another enter input at another orientation 36 that applies to the second calibration position as depicted by FIG. 2B. in the example embodiment, a High Definition display is assumed with the upper left corner location (0,0) calibrated to the first orientation input and the lower right corner location (1920, 1080) calibrated to the second orientation input. With two-point orientation, the end user defines the field of motion that smartphone 28 has to move pointer visual image 28 across display 18. For example, the end user can have different proportions of movement of smartphone 28 to get a given motion of pointer visual image 32 so that the sensitivity of the virtual laser pointer does not tie to a particular point in space. If the end user, for instance, has a projection area at a relatively large distance, precise pointing of pointer visual image 32 is enhanced with larger relative motions compared to how a physical laser pointer would operate. In an alternative embodiment, a single calibration location is provided, such as at the center of display 18, so that the calibration orientation is selected with one input that uses a default assumption for distance to the projection area 26, such as the last used proportional movement. A single calibration input allows an end user to quickly change the orientation calibration information so that the end user's hand position is not locked to a particular calibration. In other words, the virtual laser pointer adapts to different hand positions instead of forcing the end user to point at the projected content 22.

Figure 3:
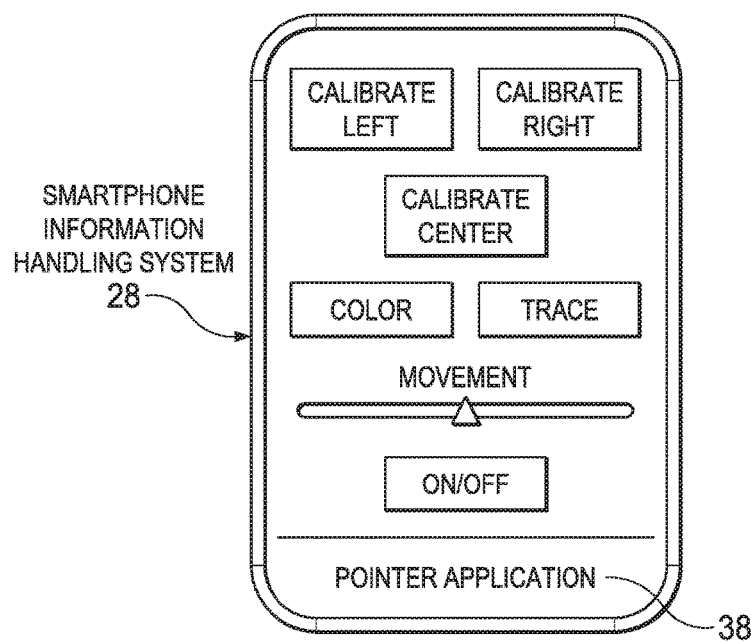
FIG. 3 depicts a portable information handling system graphical user interface for controlling presentation of a visual point image.

Referring now to FIG. 3, a portable information handling system 28 graphical user interface depicts buttons for controlling presentation of a visual point image. For example, a pointer application executing on portable information handling system 28 executes to present the user interface and manage user inputs. In the example embodiment, a calibrate left button locks orientation information for pointer visual image position as depicted in FIG. 2A and a calibrate right button locks orientation information for pointer visual image position as depicted in FIG. 2B. A calibrate center button enters orientation information as detected at button push as the center point for pointer visual image 32, while maintaining proportional movement as last defined. A color button allows the end user to select a color for the pointer visual image 32, such as by cycling through a list of available colors. A trace button turns on and off a trace of the path of pointer visual image 32 over content 22. For example an end user turns on a trace to circle one area of content 22 in red color, and then changes color to circle a different portion of content 22 in a different color. In one example embodiment, the trace button causes a trace to be presented when touched, leaves the trace when released and erases the trace when double tapped. A movement slider bar allows an end user to adjust the sensitivity of the movement of pointer visual image 32 to changes of orientation of smartphone 28. This allows the end user to change the precision with which inputs are affected or adapt to different ranges to the presentation area. An on/off button turns pointer visual image 32 on and off. In one example embodiment, pointer visual image 32 turns off when orientation of smartphone 28 translates to a location outside of the projection area or content. In the depicted user interface, graphical buttons are shown, however, in alternative embodiments, push button inputs may be used, such as by repurposing of the volume and power buttons.

Figure 4:
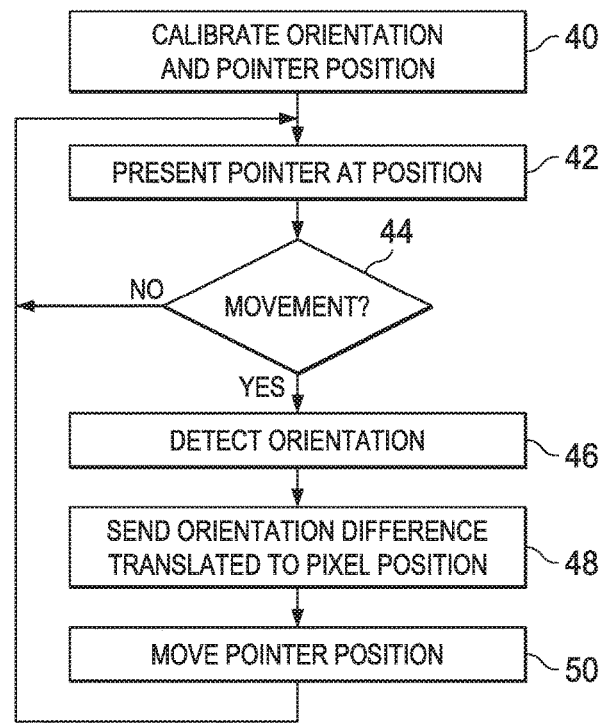
FIG. 4 depicts a flow diagram of a process for managing presentation of a visual point image at a presentation from a portable information handling system.

Referring now to FIG. 4, a flow diagram depicts a process for managing presentation of a visual point image at a presentation from a portable information handling system. At step 40, orientation of a portable information handling system is calibrated to a pointer visual image location, such as the center of a content display area. At step 42, the pointer visual image is presented at the calibration location. At step 44 a determination is made of whether motion is detected at the portable information handling system, such as with a change of orientation detected by integrated accelerometers. If not, the process returns to step 42. If motion is detected, the process continues to step 46 to detect the orientation and to step 48 to send the orientation difference from calibrated orientation translated to pixel position. At step 50, the pointer visual is moved to the new position and the process returns to step 42.

Although the present invention has been described in detail, it should be understood that various changes, substitutions and alterations can be made hereto without departing from the spirit and scope of the invention as defined by the appended claims.

What is claimed is:

1. An information handling system for imitating a laser pointer comprising:
   a processor operable to execute instructions that generate visual information;
   a presentation application executing on the processor and generating the visual information;
   a graphics processor interfaced with the presentation application and operable to generate pixel values for presenting the visual information as visual images at a display device;
   a display device interfaced with the graphics processor and operable to present the visual images with the pixel values;
   a wireless network interface card interfaced with the processor and operable to wirelessly communicate with a portable information handling system;
   a pointer application stored in non-transitory memory of the portable information handling system and executable to define a pointer visual image location for presentation of a pointer visual image at the display device, the location adapted from an origination point and orientation information of the portable information handling system; and
   a user interface integrated in the pointer application, displayed on the portable information handling system, and interfaced with one or more input devices, the user interface operable to adapt pointer visual image presentation;
   wherein the user interface includes a movement selector that adjusts a proportion of movement of the pointer visual image relative to motion of the portable information handling system.

2. The system of claim 1 further comprising: wherein the one or more input devices are integrated with the portable information handling system.

3. The system of claim 2 wherein the origination point comprises orientation information detected at the portable information handling system in response to a predetermined user input.

4. The system of claim 3 wherein the predetermined input comprises a first input with the pointer visual image displayed at a first location having first orientation information and a second input with the pointer visual image displayed at a second location having a second orientation information, the first and second locations defining diagonally opposed locations of the display device.

5. The system of claim 4 wherein the pointer application moves the pointer visual image in proportion to the difference of the first and second orientation information.

6. The system of claim 4 wherein the origination point aligns to new orientation information in response to a re-orientation user input.

7. The system of claim 1 wherein the pointer application includes a color selector that selects a color of the pointer visual image.

8. The system of claim 1 wherein the pointer application includes a trail selector that presents a trail of the locations at which the pointer visual image was displayed.

9. A method for presenting visual information from a projection information handling system for imitating a laser pointer, the method comprising:

projecting the visual image from a projector to a projection surface;

initiating projection of a pointer visual image from the projector at the projection surface, the initiating performed from a portable information handling system different than the projection information handling system;

detecting orientation of the portable information handling system at the initiating;

moving the pointer visual image at the project surface responsive to changes in orientation of the portable information handling system; and adjusting a proportion of movement of the pointer visual image relative to motion of the portable information handling system at the portable information handling system.

10. The method of claim 9 further comprising:

wirelessly interfacing the portable information handling system with the projector; and generating the pointer visual image at the projector responsive to orientation information wirelessly communicated from the portable information handling system to the projector.

11. The method of claim 10 further comprising:

performing a calibration input at the portable information handling system; and in response to the calibration input, presenting the pointer visual image at predetermined positions of the projection surface based upon orientation information communicated from the portable information handling system.

12. The method of claim 10 wherein performing a calibration input further comprises:

performing a first input at the portable information handling system with the pointer visual image at a first location, the first input associated with first orientation information of the portable information handling system;

performing a second input at the portable information handling system with the pointer visual image at a second location, the second input associated with second orientation information of the portable information handling system; and defining movement of the pointer visual image in proportion to the first and second orientation information.

13. The method of claim 9 further comprising:

wirelessly interfacing the portable information handling system with the projector information handling system; and generating the pointer visual image at the projector information handling system responsive to orientation information wirelessly communicated from the portable information handling system to the projector information handling system.

14. The method of claim 9 further comprising:

selecting a color at the portable information handling system; and in response to the selecting, presenting the pointer visual image with the selected color.

15. The method of claim 9 wherein the portable information handling system comprises a mobile phone and detecting orientation comprises detecting accelerations on plural axes with the phone.

16. The method of claim 9 further comprising:

selecting a trail presentation at the portable information handling system; and in response to the selecting, placing a trail of locations on the projection surface that traces movement of the pointer visual image.

17. The method of claim 9 further comprising removing the pointer visual image from the projection surface if orientation of the portable information handling system moves the pointer visual image from the projection surface.

\* \* \* \* \*